United States Patent
Liu et al.

(10) Patent No.: US 9,918,061 B2
(45) Date of Patent: Mar. 13, 2018

(54) SYSTEM AND METHOD FOR STORING IMAGE DATA IN PARALLEL IN A CAMERA SYSTEM

(71) Applicant: SZ DJI TECHNOLOGY CO., LTD., Shenzhen (CN)

(72) Inventors: Zhiwei Liu, Shenzhen (CN); Qiang Zhang, Shenzhen (CN); Junping Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/263,117

(22) Filed: Sep. 12, 2016

(65) Prior Publication Data
US 2016/0381338 A1    Dec. 29, 2016

Related U.S. Application Data

(63) Continuation of application No. PCT/CN2015/076013, filed on Apr. 7, 2015.

(51) Int. Cl.
*H04N 5/235* (2006.01)
*H04N 9/804* (2006.01)
(Continued)

(52) U.S. Cl.
CPC ....... *H04N 9/8042* (2013.01); *G06F 13/4282* (2013.01); *G06T 1/60* (2013.01);
(Continued)

(58) Field of Classification Search
None
See application file for complete search history.

(56) References Cited

U.S. PATENT DOCUMENTS

| 6,963,219 B1 | 11/2005 | Ghia et al. |
| 2002/1001410 | 1/2002 | Hagiwara |

(Continued)

FOREIGN PATENT DOCUMENTS

| CN | 1731861 | 2/2006 |
| CN | 103247035 | 8/2013 |

(Continued)

OTHER PUBLICATIONS

Written Opinion of the International Search Authority dated Jul. 17, 2015, issued by the State Intellectual Property Office of the P.R. China in counterpart International Application No. PCT/CN2015/076013; 4 pages.

(Continued)

*Primary Examiner* — Stephen Coleman
(74) *Attorney, Agent, or Firm* — Finnegan, Henderson, Farabow, Garrett & Dunner, L.L.P.

(57) ABSTRACT

System and method can support an image signal processing apparatus, such as a camera system. The image signal processing apparatus includes a processing device, such as a field programmable gate array (FPGA) device, which operates to receive one or more image data from an image sensor via an image data interface. The processing device can forward the received one or more image data to an image signal processor, wherein said image signal processor operates to compress the received one or more image data and save the compressed image data in a first storage medium. Furthermore, the processing device can export the received one or more image data to a second storage medium via a data communication interface.

26 Claims, 7 Drawing Sheets

(51) Int. Cl.
*H04N 19/423* (2014.01)
*H04N 19/436* (2014.01)
*G06F 13/42* (2006.01)
*G06T 1/60* (2006.01)
*H04N 5/225* (2006.01)
*H04N 5/907* (2006.01)
*H04N 9/04* (2006.01)

(52) U.S. Cl.
CPC ........... *H04N 5/2254* (2013.01); *H04N 5/907* (2013.01); *H04N 9/045* (2013.01); *H04N 19/423* (2014.11); *H04N 19/436* (2014.11)

(56) References Cited

U.S. PATENT DOCUMENTS

| | | | | |
|---|---|---|---|---|
| 2002/0081104 | A1 | 6/2002 | Shimizu | |
| 2009/0219395 | A1* | 9/2009 | Baker | H04N 17/00 348/180 |
| 2010/0287295 | A1* | 11/2010 | Schaffa | H04L 65/1089 709/231 |
| 2011/0181756 | A1* | 7/2011 | Kazami | G11B 27/326 348/231.99 |
| 2013/0258127 | A1* | 10/2013 | Jang | H04N 5/23293 348/220.1 |
| 2013/0329063 | A1* | 12/2013 | Zhou | H04N 5/217 348/208.6 |
| 2014/0279946 | A1* | 9/2014 | Scarpino | G06F 17/30371 707/691 |
| 2014/0333808 | A1 | 11/2014 | Fowler et al. | |
| 2015/0181148 | A1* | 6/2015 | Slovick | H04N 5/378 348/231.99 |

FOREIGN PATENT DOCUMENTS

| | | |
|---|---|---|
| JP | 2008-288723 | 11/2008 |
| JP | 2013-175824 | 9/2013 |
| JP | 2013-242669 | 12/2013 |
| KR | 2005-0112998 | 12/2005 |
| WO | WO-03/096195 | 11/2003 |
| WO | WO-2008/143799 | 11/2008 |
| WO | WO 2011/148573 | 12/2011 |

OTHER PUBLICATIONS

International Search Report dated Jul. 17, 2015, issued by the State Intellectual Property Office of the P.R. China in counterpart International Application No. PCT/CN2015/076013; 3 pages.

* cited by examiner

SYSTEM AND METHOD FOR STORING IMAGE DATA IN PARALLEL IN A CAMERA SYSTEM

CROSS REFERENCE TO RELATED APPLICATIONS

This application is a continuation application of International Application No. PCT/CN2015/076013, filed Apr. 7, 2015, the content of which is incorporated herein by reference in its entirety.

BACKGROUND OF THE INVENTION

The disclosed embodiments relate generally to digital image signal processing and more particularly, but not exclusively, to processing and storing image data.

With the development of faster and higher resolution image sensors, the modern camera becomes ever more versatile and powerful. For example, a cinema camera can use an image sensor to generate a rapid sequence of photographs (i.e., multiple frames of images in one shot), while each photograph (or image frame) contains a large amount of pixels. Thus, there is a need for processing and storing a large amount of image data in the modern camera system. This is the general area that embodiments of the invention are intended to address.

BRIEF SUMMARY OF THE INVENTION

Described herein are systems and methods that can support an image signal processing apparatus, such as a camera system. The image signal processing apparatus includes a processing device, such as a field programmable gate array (FPGA) device, which operates to receive one or more image data from an image sensor via an image data interface. The processing device can forward the received one or more image data to an image signal processor, wherein said image signal processor operates to compress the received one or more image data and save the compressed image data in a first storage medium. Furthermore, the processing device can export the received one or more image data to a second storage medium via a data communication interface.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses a field-programmable gate array (FPGA) device as example for a processing device. It will be apparent to those skilled in the art that other types of processing devices can be used without limitation.

An Exemplary Camera System

Figure 1:
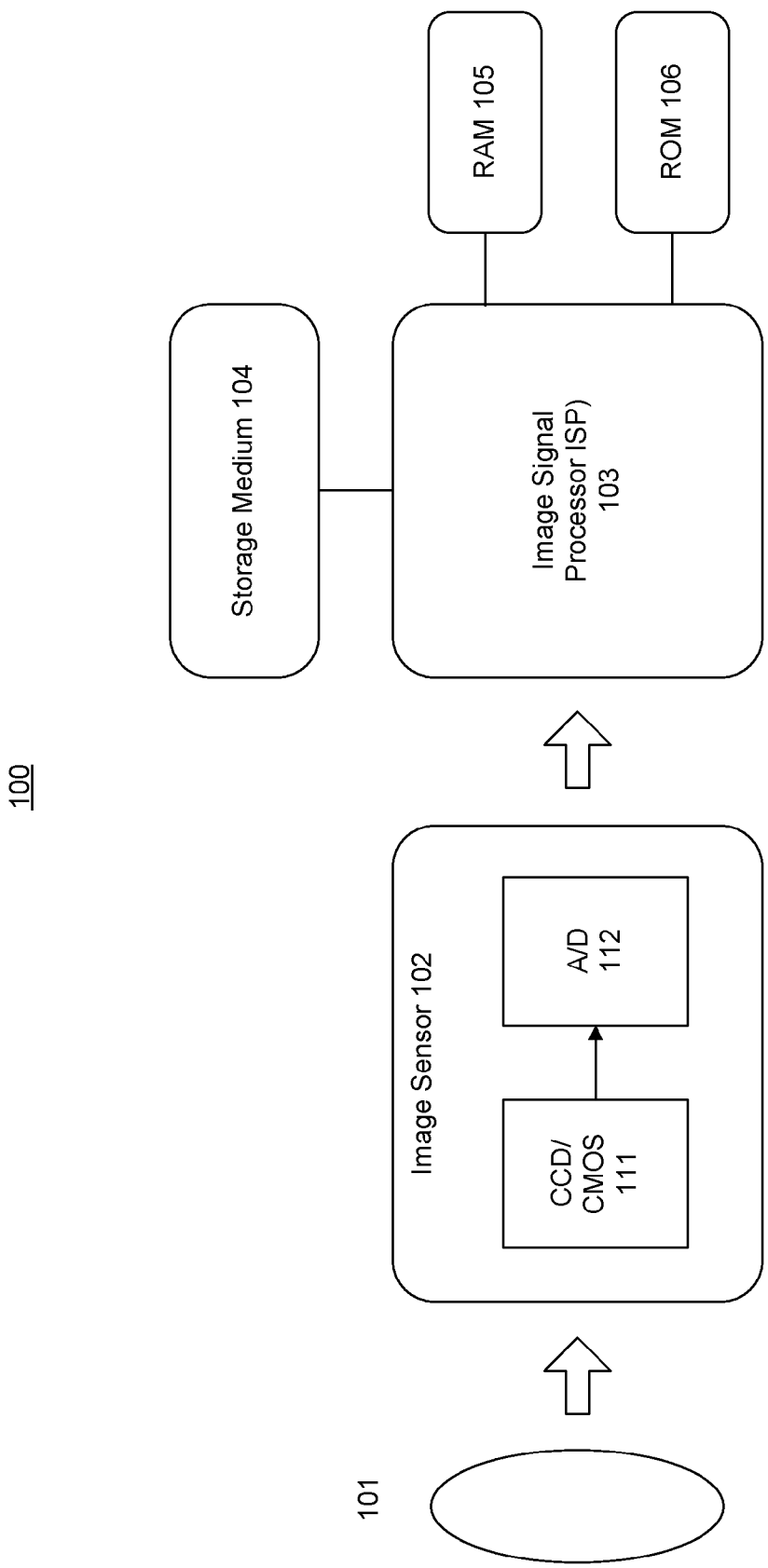
FIG. 1 is an exemplary illustration of an exemplary camera system, in accordance with various embodiments of the present invention.

FIG. 1 is an exemplary illustration of a camera system, in accordance with various embodiments of the present invention. As shown in FIG. 1, a camera system 100 includes various components such as a lens 101, an image sensor 102, and an image signal processor (ISP) 103. For example, the image sensor 102 can include a CCD/CMOS device 109. Alternatively, the image sensor 102 can be based on an N-type metal-oxide-semiconductor (NMOS) device and other hybrids/variants thereof.

The image sensor 102 can convert light signals collected by a light collection device (e.g. the lens 101) into electric signals (e.g. analog signals). Then, an A/D converter 112 can convert the analog signals into the digital signals that can be processed by the ISP 103. Additionally, the ISP 103 can use a RAM 105 and a ROM 106 as data storage (e.g. for caching and buffering purposes).

As shown in FIG. 1, the ISP 103 can receive from the image sensor 102 the image data that are generated by the image sensor 102 in raw data format. For example, the ISP 103 can receive the image data via a multi-path high-speed differential signal transporting interface, such as a low-voltage differential signaling (LVDS) interface and/or a sub-LVDS interface.

In accordance with various embodiments of the present invention, the image sensor 102 can generate a large amount of raw image data, which may overwhelm the camera system 100 in real time. Thus, in order to accommodate for the limited processing and storage capability of the camera system 100, the ISP 103 may need to compress the raw image data before storing the compressed image data into the storage medium 104 (e.g. a memory card).

Storing Image Data in Parallel

Figure 2:
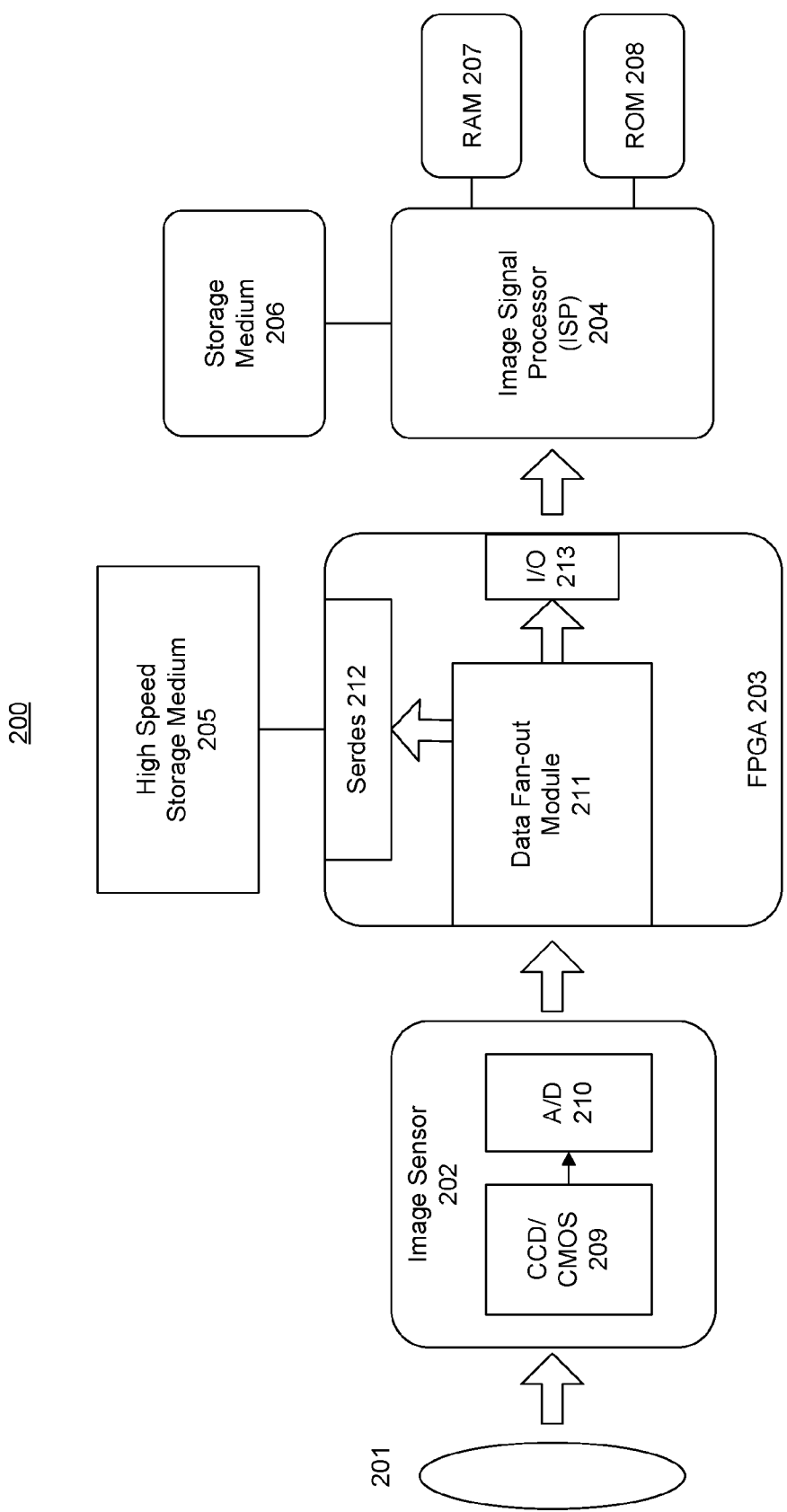
FIG. 2 is an exemplary illustration of a camera system that is capable of storing image data in parallel, in accordance with various embodiments of the present invention.

FIG. 2 is an exemplary illustration of a camera system that is capable of storing image data in parallel, in accordance with various embodiments of the present invention. As shown in FIG. 2, a camera system 200 can include various components, such as a lens 201, an image sensor 202, and an image signal processor (ISP) 204. For example, the image sensor 202 can include a CCD/CMOS device 209. Alternatively, the image sensor 202 can be based on an N-type metal-oxide-semiconductor (NMOS) device and other hybrids/variants thereof.

The image sensor 202 can convert light signals collected by a light collection device (e.g. the lens 201) into electric signals (e.g. analog signals). Then, an A/D converter 212 can convert the analog signals into the digital signals that can be processed by the ISP 204.

As shown in FIG. 2, the camera system 200 includes a processing device such as a field-programmable gate array (FPGA) device 203, which can receive the digital signals generated by the image sensor 202 (e.g. in an image data flow). Additionally, the FPGA device 203 can perform intermediate data processing tasks between the image sensor 202 and the ISP 204. Additionally, the ISP 204 can use a RAM 207 and a ROM 208 as data storage (e.g. for caching and buffering purposes).

In accordance with various embodiments of the present invention, the FPGA device 204 can include a data fan-out module 211, which can simultaneously forward the received digital image signals along multiple paths targeting different components within or outside of the camera system 200, e.g. via different modules (or units) on the FPGA device 204. Alternatively, the data fan-out module 211 can forward the received digital image signals toward the different components within or outside of the camera system 200 at different times.

As shown in FIG. 2, the FPGA device 204 can use an I/O module 213 for transmitting the received digital image signals to the ISP 204. Then, the ISP 204 can compress the received raw image data and save the compressed image data into the storage medium 206 (e.g. a memory card).

Additionally, the FPGA device 204 can configure the serialization/deserialization (Serdes) module 212 for storing the received digital signals in a high speed storage medium 205, such as a solid state disk (SSD). The raw image data stored in the high speed storage medium 205 can provide more information than the compressed image data saved in the storage medium 206. Such information can be beneficial to improving the handling of the image processing at late stage, such as assisting the professional photographic treatment of the images.

Figure 3:
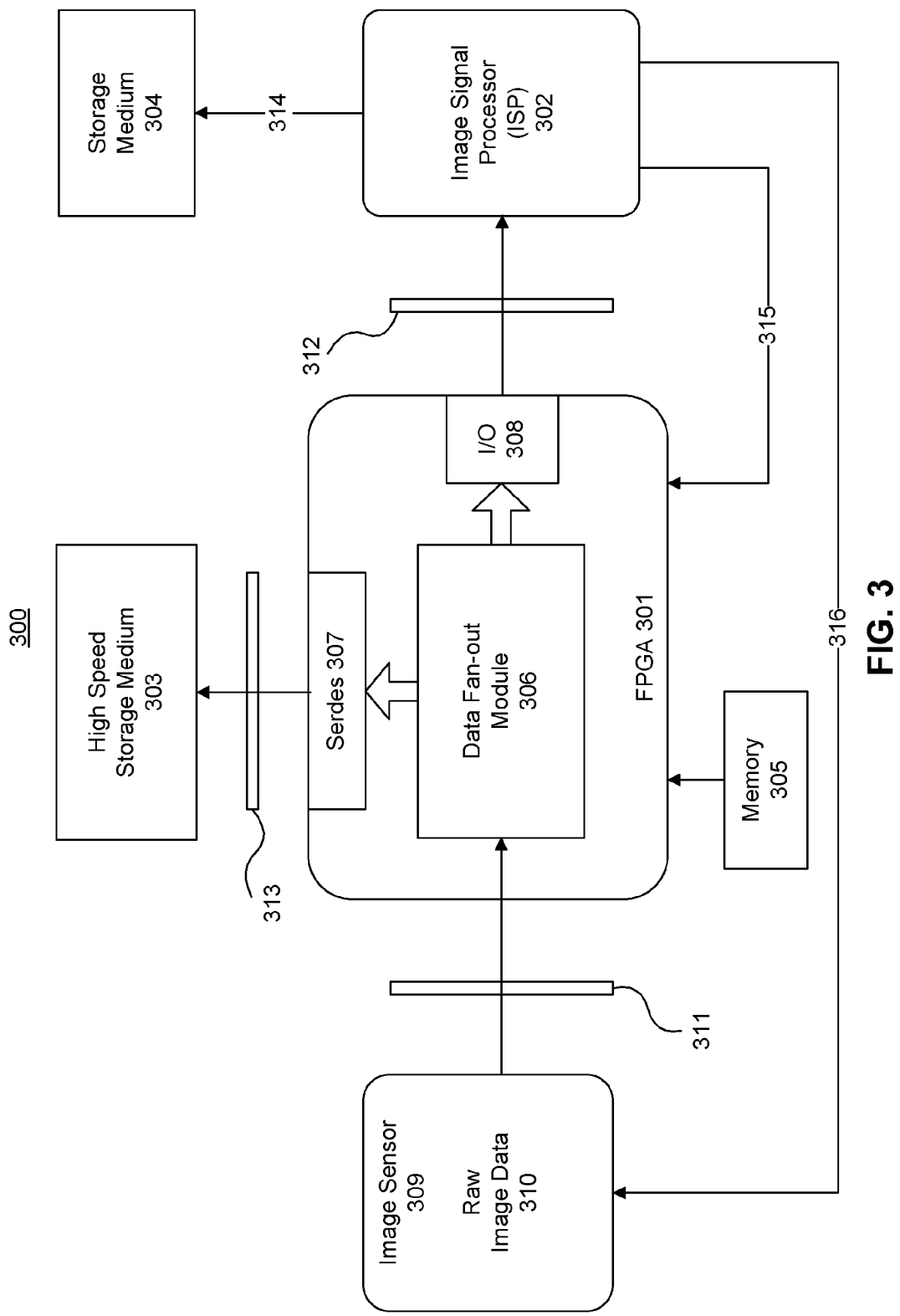
FIG. 3 is an exemplary illustration of providing various interfaces in an image signal processing system for storing image data in parallel, in accordance with various embodiments of the present invention.

FIG. 3 is an exemplary illustration of providing various interfaces in an image signal processing system for storing image data in parallel, in accordance with various embodiments of the present invention. As shown in FIG. 3, an image signal processing system 300 can take advantage of a FPGA device 301 for processing and storing the raw image data 310. The FPGA device 301 can receive the raw image data 310 from an image sensor 309 via an image data interface 311.

For example, the image data interface 311 can be based on a serial scalable low-voltage signaling (SLVS), a serial mobile industry processor interface (MIPI) camera serial interface (CSI), a parallel sub-LVDS, a parallel low voltage complementary metal oxide semiconductor (LVCMOS), a fast YUV source, or other image data communication protocols.

In accordance with various embodiments of the present invention, the image data interface 311 can be configured to pass the raw image data 310 to the FPGA device 301 in a parallel fashion (e.g. with configuration options such as ×2, ×3, ×4, ×8, ×12, ×16 and more).

Furthermore, the FPGA device 301 can be initiated and configured (or reconfigured) using various information, such as instructions stored in the memory 305 (e.g. a flash memory). For example, depending on the type of the image sensor 309, the FPGA device 301 can be configured to support (or is adapted to) the image data interface 311, which is associated with any one of the above image data communication protocols.

As shown in FIG. 3, the FPGA device 301 can include a data fan-out module 306, which can simultaneously forward the received raw digital image data 310 to a serialization/deserialization (Serdes) module 307 and an I/O module 308. Alternatively, the data fan-out module 306 can forward the received raw digital image data 310 to the Serdes module 307 and the I/O module 308 at different times. Also, the data fan-out module 306 can forward the received raw digital image data 310 to other targets or modules on the FPGA device 301 either simultaneously or at different times.

The FPGA device 301 can use the I/O module 308 for transmitting the received digital image signals to the ISP 302, via an image interface 312. The image interface 312 may have a similar configuration as the image data interface 311. Then, the ISP 302 can compress the received raw image data and save the compressed image data 314 into the storage medium 304.

Additionally, the FPGA device 301 can configure the Serdes module 307 to use a data communication protocol 313 for storing the received digital signals in a high speed storage medium 303, e.g. a solid state disk (SSD). For example, the data communication protocol 313 can be a high speed serial interfacing protocol, such as a serial ATA (SATA) interface and/or a peripheral component interconnect express (PCIe) protocol.

In accordance with various embodiments of the present invention, the Serdes module 307 can convert the received raw image data from a configuration that supports the image data interface 311 to a different configuration that supports the data communication protocol 313 in real time. For example, the Serdes module 307 can convert the received raw image data, which are received in parallel, to support the data communication protocol 313, which may operates in a serial fashion.

Also as shown in FIG. 3, the ISP 302 can reconfigure the image sensor 309 either directly via a control interface 316 or indirectly via the FPGA 301 (using a control interface 315). Then, the FPGA 301 can dynamically modify the I/O pin assignment and other configurations in order to accommodate for the configuration changes on the image sensor 309.

Figure 4:
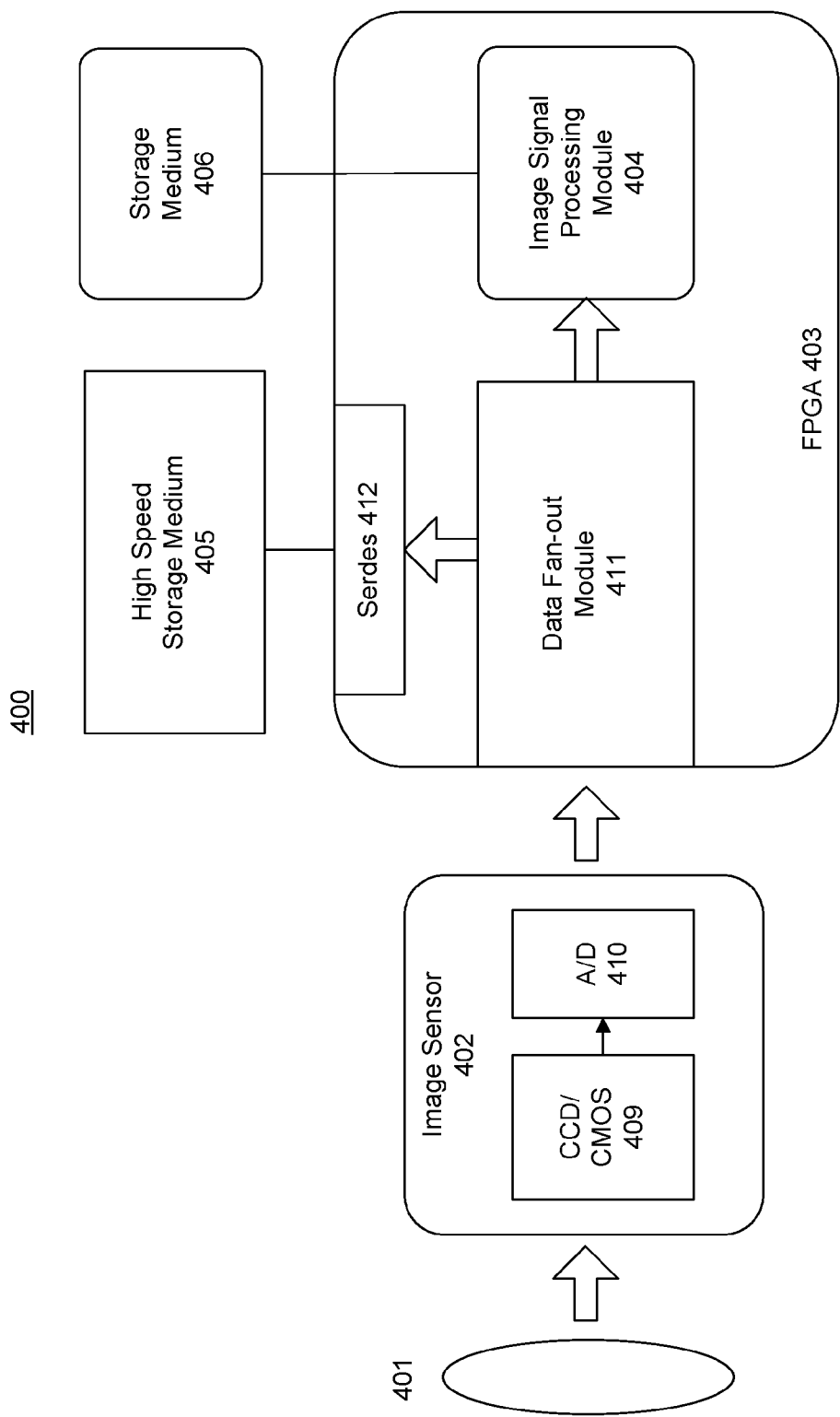
FIG. 4 is an exemplary illustration of an alternative camera system that is capable of storing image data in parallel, in accordance with various embodiments of the present invention.

FIG. 4 is an exemplary illustration of an alternative camera system that is capable of storing image data in parallel, in accordance with various embodiments of the present invention. As shown in FIG. 4, a camera system 400 can include various components, such as a lens 401 and an image sensor 402. For example, the image sensor 402 can include a CCD/CMOS device 409. Alternatively, the image sensor 402 can be based on an N-type metal-oxide-semiconductor (NMOS) device and other hybrids/variants thereof.

The image sensor 402 can convert light signals collected by a light collection device (e.g. the lens 401) into electric signals, such as analog signals. Then, an A/D converter 410 can convert the analog signals into digital signals.

In accordance with various embodiments of the present invention, the camera system 400 includes a processing device such as a field-programmable gate array (FPGA) device 403. The FPGA device 403 can include a data fan-out module 411, which can simultaneously forward the received digital image signals to modules (or units) on the FPGA device 403, such as a serialization/deserialization (Serdes) module 412 and an image signal processing module 404. Alternatively, the data fan-out module 411 can forward the received raw digital image data 310 to the different modules at different times.

As shown in FIG. 4, the FPGA device 403 can configure the Serdes module 412 for storing the received digital signals in a high speed storage medium 405, such as a solid state disk (SSD), via a data communication protocol.

Additionally, the FPGA device 403 can forward the received raw image data directly to an image signal processing module 404 on the FPGA device 403, which provides the functionality of an image signal processor (ISP). Then, the image signal processing module 404 on the FPGA device 403 can compress the received raw image data and save the compressed image data in the storage medium 406 (e.g. a memory card).

Figure 5:
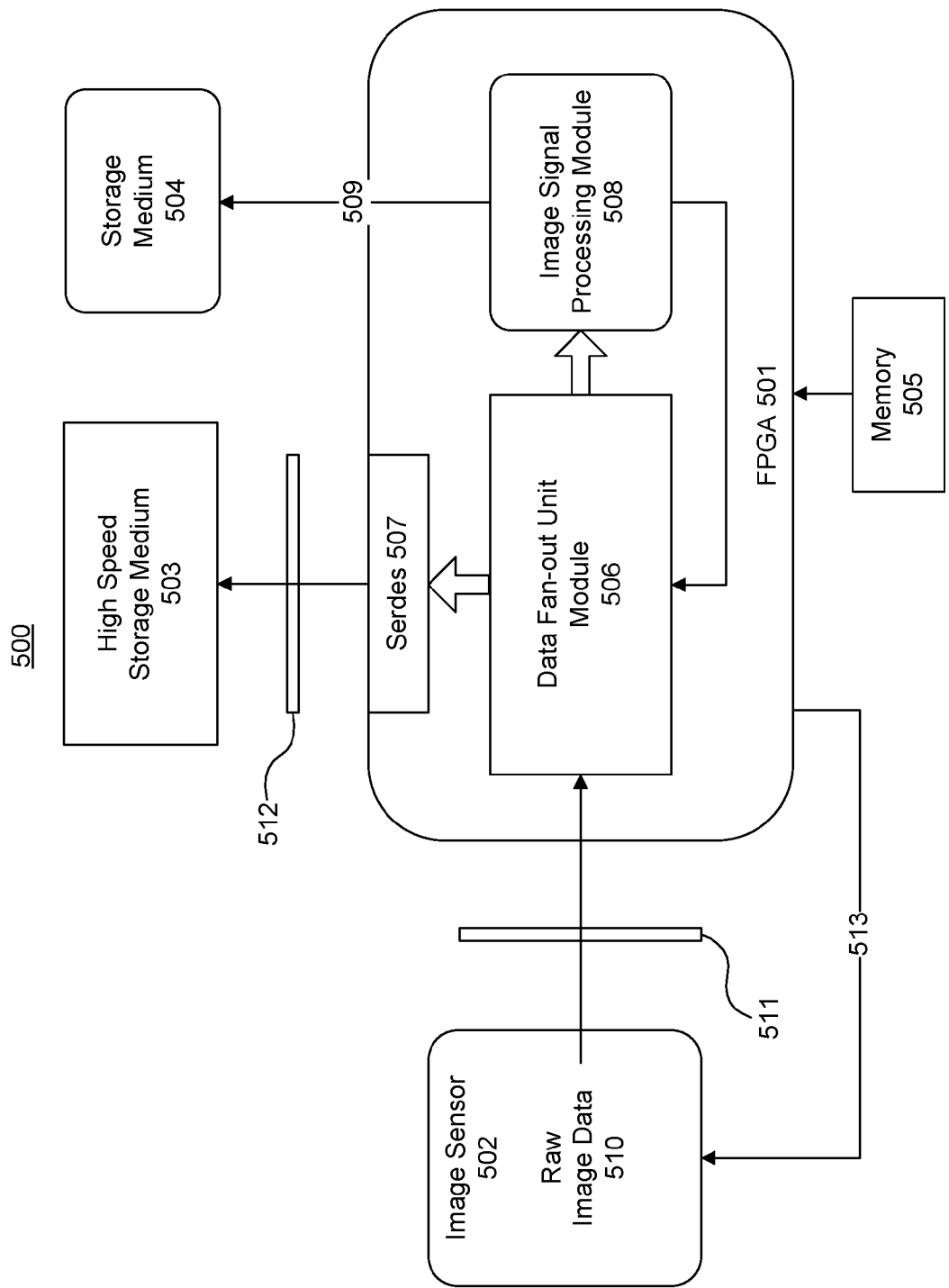
FIG. 5 is an exemplary illustration of providing various interfaces in an alternative image signal processing system for storing image data in parallel, in accordance with various embodiments of the present invention.

FIG. 5 is an exemplary illustration of providing various interfaces in an alternative image signal processing system for storing image data in parallel, in accordance with various embodiments of the present invention. As shown in FIG. 5, an image signal processing system 500 can take advantage of a FPGA device 501 for processing and storing the raw image data 510.

For example, the image data interface 511 can be based on a serial scalable low-voltage signaling (SLVS), a serial mobile industry processor interface (MIPI) camera serial interface (CSI), a parallel sub-LVDS, a parallel low voltage complementary metal oxide semiconductor (LVCMOS), a fast YUV source, or other image data communication protocols.

Furthermore, the image data interface 511 can be configured to pass the raw image data 510 to the FPGA device 501 in a parallel fashion (e.g. with configuration options such as ×2, ×3, ×4, ×8, ×12, ×16 and more).

In accordance with various embodiments of the present invention, the FPGA device 501 can be initiated and configured (or reconfigured) using various information (e.g. instructions) stored in the memory 505 (e.g. a flash memory). For example, depending on the type of the image sensor 509, the FPGA device 501 can be configured to support different image data communication protocols associated with the image data interface 511.

As shown in FIG. 5, the FPGA device 501 can include a data fan-out module 506, which can simultaneously forward the received raw digital image data 510 to different modules on the FPGA device 501. Alternatively, the data fan-out module 506 can forward the received raw digital image data 510 to the Serdes module 507 and the I/O module 508 at different times. Also, the data fan-out module 506 can forward the received raw digital image data 510 to other targets or modules on the FPGA device 501 either simultaneously or at different times.

The data fan-out module 506 can forward the received raw image data 510 to an image signal processing (ISP) module 508, which can compress the received raw image data and save the compressed image data 509 into the storage medium 504 (e.g. a memory card).

Also, the data fan-out module 506 can forward the received raw image to the Serdes module 507, which uses a data communication interface 512 for saving the raw image data into a high speed storage medium 503, e.g. a solid state disk (SSD). For example, the data communication protocol 512 can be a high speed serial interfacing protocol, such as a serial ATA (SATA) interface and/or a peripheral component interconnect express (PCIe) protocol.

In accordance with various embodiments of the present invention, the Serdes module 507 can convert the received raw image data from a configuration that supports the image data interface 511 to a different configuration that supports the data communication protocol 512 in real time. For example, the Serdes module 507 can convert the received raw image data, which are received in parallel, to support the data communication protocol 512, which may be in a serial fashion.

As shown in FIG. 5, in real time, the FPGA 501 can reconfigure the image sensor 502 via a control interface 513. Also, the FPGA 501 can dynamically modify the I/O pin assignment and other configurations in order to accommodate for such changes on the image sensor 502.

Figure 6:
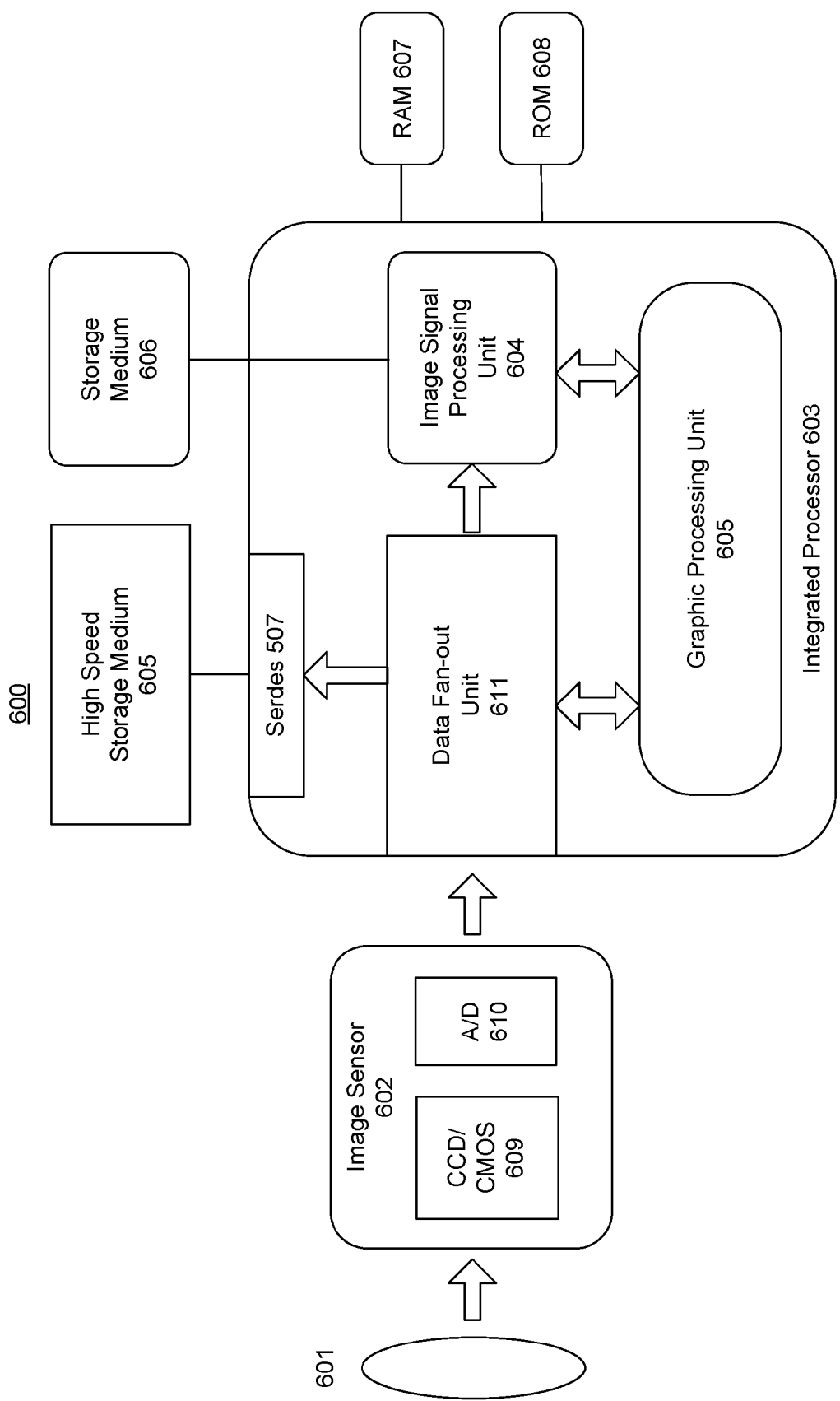
FIG. 6 is an exemplary illustration of another alternative camera system that is capable of storing image data in parallel, in accordance with various embodiments of the present invention.

FIG. 6 is an exemplary illustration of another alternative camera system that is capable of storing image data in parallel, in accordance with various embodiments of the present invention. As shown in FIG. 6, a camera system 600 can include various components, such as a lens 601 and an image sensor 602. For example, the image sensor 602 can include a CCD/CMOS device 609. Alternatively, the image sensor 602 can be based on an N-type metal-oxide-semiconductor (NMOS) device and other hybrids/variants thereof.

The image sensor 602 can convert light signals collected by a light collection device (e.g. the lens 601) into electric signals, such as analog signals. Then, an A/D converter 610 can convert the analog signals into digital signals.

As shown in FIG. 6, the camera system 600 includes a processing device such as an integrated processor 603, which uses a RAM 607 and a ROM 608 as data storage (e.g. for caching and buffering purposes). The integrated processor 603 can include different ASIC units, such as a data fan-out unit 611, a serialization/deserialization (Serdes) unit 612, an image signal processing unit 604, and a graphic processing unit 605.

The data fan-out unit 611 can simultaneously forward the received digital image signals along multiple paths, e.g. via different units on the integrated processor 603. Alternatively, the data fan-out unit 611 can forward the received raw digital image data to the Serdes unit 612 and the image signal processing unit 604 at different times.

As shown in FIG. 6, the Serdes unit 612 can store the received digital signals into a high speed storage medium 205, such as a solid state disk (SSD), via a data communication protocol. The image signal processing unit 604 can compress the received raw image data and save the compressed image data into the storage medium 606 (e.g. a memory card).

Additionally, the graphic processing unit 605 can receive the raw and processed image data from the data fan-out unit 611 and/or the image signal processing unit 604, and perform various graphic processing tasks. Additionally, the graphic processing unit 605 can save the processed graphic information in either the storage medium 606 or the high speed storage medium 605 and provides the graphic information to other components within or outside of the camera system 600.

Figure 7:
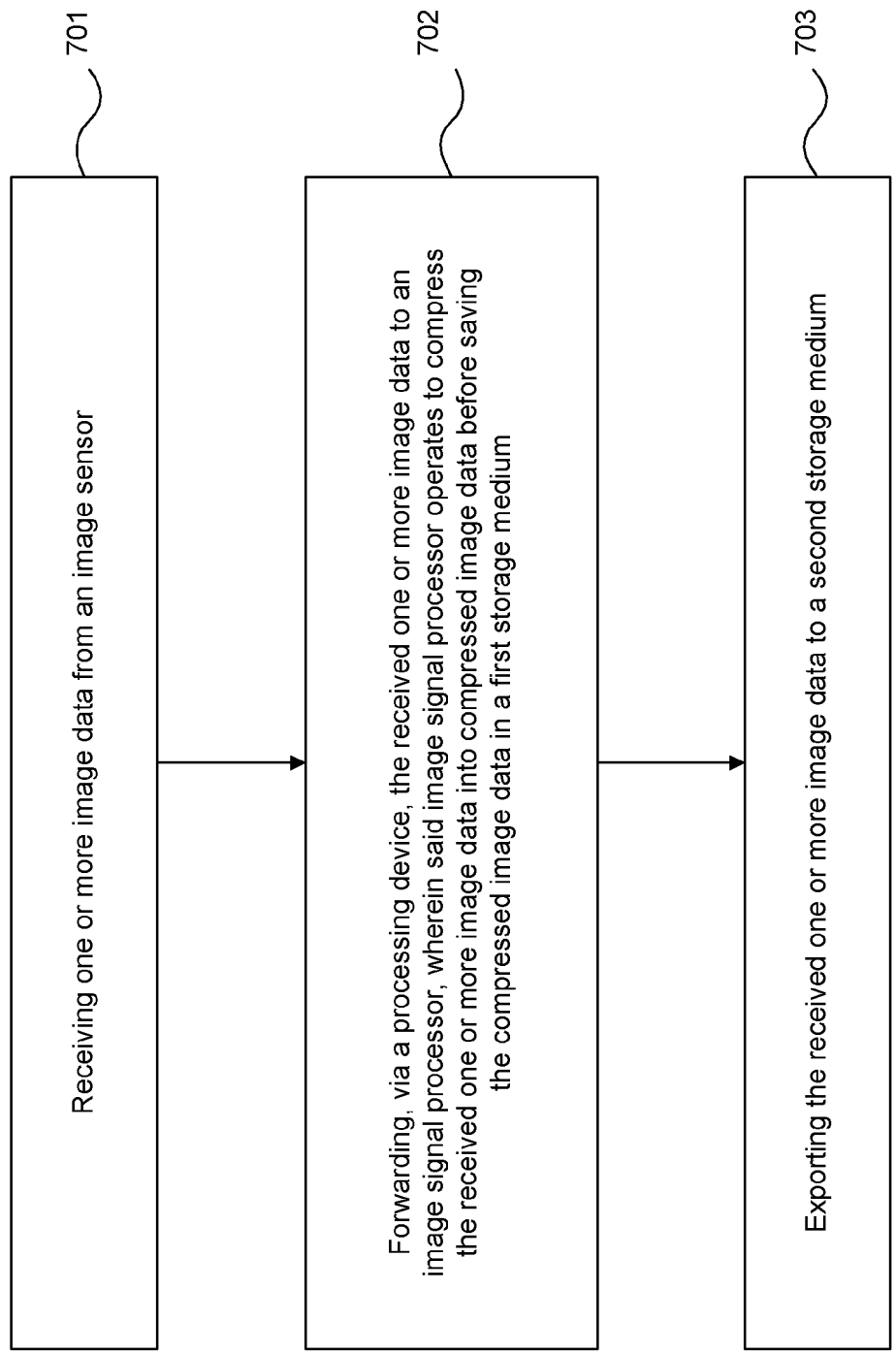
FIG. 7 shows a flowchart of storing image data in parallel, in accordance with various embodiments of the present invention.

FIG. 7 shows a flowchart of storing image data in parallel, in accordance with various embodiments of the present invention. As shown in FIG. 7, at step 701, a processing device can receive one or more image data from an image sensor. Then, at step 702, the processing device can forward the received one or more image data to an image signal processor, wherein said image signal processor operates to compress the received one or more image data into compressed image data before saving the compressed image data in a first storage medium. Furthermore, at step 703, the processing device can export the received one or more image data to a second storage medium.

Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An image signal processing method, comprising:
   receiving, at a processing device, one or more image data from an image sensor, the processing device having a first input/output (I/O) pin assignment corresponding to a configuration of the image sensor;
   forwarding, via the processing device, the received one or more image data to an image signal processor, wherein said image signal processor operates to compress the received one or more image data and save the compressed image data in a first storage medium, and said processing device is a field programmable gate array (FPGA) device;
   exporting, via the processing device, the received one or more image data to a second storage medium; and
   modifying, via the processing device, the first I/O pin assignment in order to support a modified configuration for the image sensor.

2. The image processing method of claim 1, further comprising:
   using an image data interface to receive the one or more image data from the image sensor, wherein the image data interface is based on a protocol that is selected from a group of image data communication protocols.

3. The image processing method of claim 1, further comprising:
   using a data communication interface to export the received one or more image data to the second storage medium, wherein the data communication interface is based on a protocol that is selected from a group of high speed serial interfacing protocols.

4. The image processing method of claim 1, further comprising:
   converting the received one or more image data from a first configuration, which supports an image data interface for the image sensor, to a second configuration, which supports a data communication interface for a high speed data storage.

5. The image processing method of claim 1, further comprising:
   using, via the image signal processor, a control interface to reconfigure the image sensor.

6. The image processing method of claim 1, wherein:
   the image signal processor (ISP) is an image signal processing module in the processing device.

7. The image processing method of claim 1, wherein:
the processing device is an integrated processor, which includes a graphic processing unit (GPU).

8. The image processing method of claim 1, further comprising:
receiving the one or more image data in an image data flow, which includes a plurality of frames of images.

9. The image processing method of claim 1, further comprising:
including the processing device in a high resolution cinema camera, wherein the one or more image data received by the processing device is in a raw image data format.

10. The image processing method of claim 1, wherein:
the first storage medium includes a memory card and the second storage medium includes a solid state disk (SSD).

11. The image processing method of claim 1, further comprising:
providing a data fan-out module on the processing device, wherein the data fan-out module operates to forward the received one or more image data to different modules on the processing device.

12. The image processing method of claim 11, further comprising:
forwarding, via an input/out (I/O) module on the processing device, the received one or more image data to the image signal processor; and
exporting, via a serializer/deserializer (Serdes) module on the processing device, the received one or more image data to the second storage medium, which is a high speed storage medium.

13. An image signal processing apparatus, comprising:
a processing device having a first input/output (I/O) pin assignment corresponding to a configuration of an image sensor, wherein the processing device operates to
receive one or more image data from the image sensor;
forward the received one or more image data to an image signal processor, wherein said image signal processor operates to compress the received one or more image data and save the compressed image data in a first storage medium, and said processing device is a field programmable gate array (FPGA) device;
export the received one or more image data to a second storage medium; and
modify the first I/O pin assignment in order to support a modified configuration for the image sensor.

14. The image processing apparatus of claim 13, further comprising:
an image data interface to receive the one or more image data from the image sensor, wherein the image data interface is based on a protocol that is selected from a group of image data communication protocols.

15. The image processing apparatus of claim 13, further comprising:
a data communication interface to export the received one or more image data to the second storage medium, wherein the data communication interface is based on a protocol that is selected from a group of high speed serial interfacing protocols.

16. The image processing apparatus of claim 13, wherein:
the processing device operates to convert the received one or more image data from a first configuration, which supports an image data interface for the image sensor, to a second configuration, which supports a data communication interface for a high speed data storage.

17. The image processing apparatus of claim 13, wherein:
the image signal processor use a control interface to reconfigure the image sensor.

18. The image processing apparatus of claim 13, wherein:
the image signal processor (ISP) is an image signal processing module in the processing device.

19. The image processing apparatus of claim 13, wherein:
the processing device is an integrated processor, which includes a graphic processing unit (GPU).

20. The image processing apparatus of claim 13, wherein:
the processing device operates to receive the one or more image data in an image data flow, which includes a plurality of frames of images.

21. The image processing apparatus of claim 13, wherein:
the processing device is part of a high resolution cinema camera, wherein the one or more image data received by the processing device is in a raw image data format.

22. The image processing apparatus of claim 13, wherein:
the first storage medium includes a memory card and the second storage medium includes a solid state disk (SSD).

23. The image processing apparatus of claim 13, further comprising:
a data fan-out module on the processing device, wherein the data fan-out module operates to forward the received one or more image data to different modules on the processing device.

24. The image processing apparatus of claim 23, wherein:
the processing device includes
an input/out (I/O) module, which operates to forward the received one or more image data to the image signal processor; and
a serializer/deserializer (Serdes) module, which operates to export the received one or more image data to the second storage medium, which is a high speed storage medium.

25. A non-transitory computer-readable medium with instructions stored thereon, that when executed by a processor, perform the steps comprising:
receiving, at a processing device, one or more image data from an image sensor the processing device having a first input/output (I/O) pin assignment corresponding to a configuration of the image sensor;
forwarding, via the processing device, the received one or more image data to an image signal processor, wherein said image signal processor operates to compress the received one or more image data and save the compressed image data in a first storage medium, and said processing device is a field programmable gate array (FPGA) device;
exporting, via the processing device, the received one or more image data to a second storage medium; and
modifying, via the processing device, the first I/O pin assignment in order to support a modified configuration for the image sensor.

26. A camera system, comprising:
an image sensor, which is coupled to a lens, operates to generate one or more image data; and
a processing device having a first input/output (I/O) pin assignment corresponding to a configuration of the image sensor, wherein the processing device operates to
receive one or more image data from the image sensor;
forward the received one or more image data to an image signal processor, wherein said image signal processor operates to compress the received one or more image data and save the compressed image data in a first storage medium;
export the received one or more image data to a second storage medium; and
modify the first I/O pin assignment in order to support a modified configuration for the image sensor, wherein said processing device is a field programmable gate array (FPGA) device.

* * * * *